United States Patent

Robertsson

[11] Patent Number: 5,937,128
[45] Date of Patent: Aug. 10, 1999

[54] WAVEGUIDE CONNECTOR AND METHOD OF FORMING A WAVEGUIDE CONNECTOR

[75] Inventor: Mats Robertsson, Stockholm, Sweden

[73] Assignee: Telefonaktiebolaget LM Ericsson, Stockholm, Sweden

[21] Appl. No.: 08/923,924

[22] Filed: Sep. 5, 1997

[30] Foreign Application Priority Data

Sep. 6, 1996 [SE] Sweden .................................. 9603257

[51] Int. Cl.⁶ ........................................................ G02B 6/10
[52] U.S. Cl. .......................... 385/129; 385/130; 385/131; 156/245; 264/1.24
[58] Field of Search .................................... 385/129, 130, 385/131, 132; 156/245, 244.26, 244.27; 264/1.24, 2.7

[56] References Cited

U.S. PATENT DOCUMENTS 5,540,799   7/1996   Lebby et al. ............................ 156/245

FOREIGN PATENT DOCUMENTS 0 480 618 A2   4/1992   European Pat. Off. .

OTHER PUBLICATIONS

International–Type Search Report—corresponding to SE 9603257–8, mailed May 14, 1997.

Primary Examiner—Phan Palmer
Attorney, Agent, or Firm—Burns, Doane, Swecker & Mathis, L.L.P.

[57] ABSTRACT

The present invention relates to a method and a device for manufacturing a waveguide pattern in a waveguide connector. The waveguide connector comprising a topographic pattern is placed over a transparent polymeric multilayer laminate arranged on a rigid foundation, where at least one layer consist of a core and at least two other layers are formed of a cladding material, said cladding material surrounding said core layer, each on one side, and the cladding material having a lower refractive index than the core material. The waveguide connector is pressed towards the polymeric multilayer laminate so that the topographic pattern in the waveguide connector stands out in relief in the laminate to form the waveguide pattern in the waveguide connector and where the multilayer laminate is fixed in the waveguide connector after pressing.

40 Claims, 6 Drawing Sheets

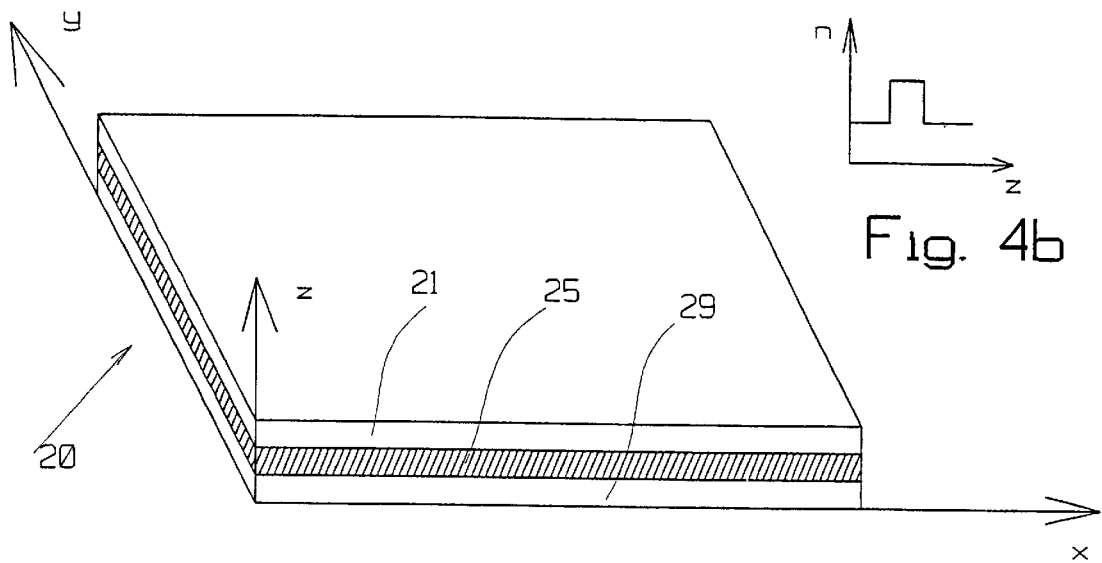
Fig. 4a
Fig. 4b
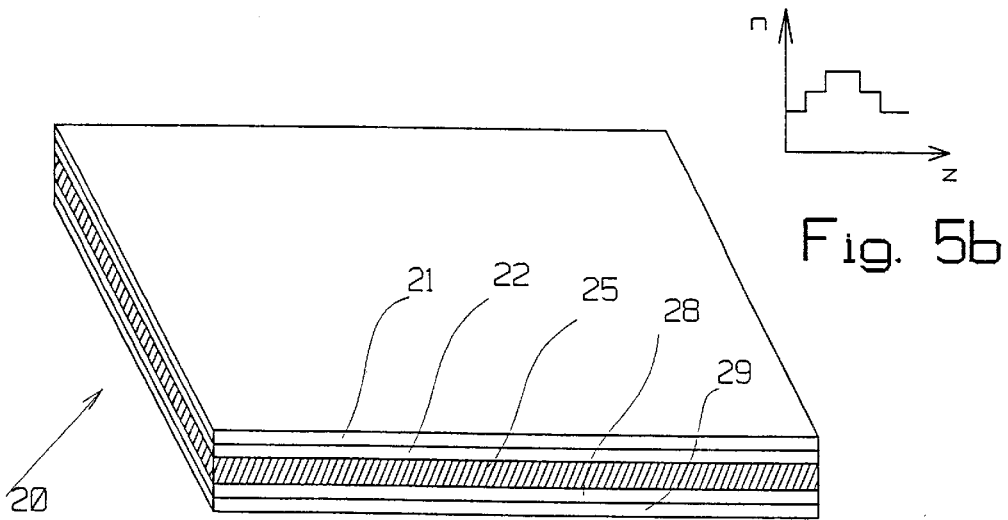
Fig. 5a
Fig. 5b

WAVEGUIDE CONNECTOR AND METHOD OF FORMING A WAVEGUIDE CONNECTOR

TECHNICAL FIELD

The present invention relates to a method and a device for arranging a waveguide pattern in a waveguide connector.

1. State of the Art

Short optical connections (<100 cm) will probably be used in future electronic equipment where a big demand is placed on the transmission speed (in the order of size of a number of Gbits/sec). Polymeric optical light-waveguides have a potential to be more cost-effective in many applications than alternative solutions based on glass fibers, especially where many tightly packed conductors or branches are needed.

There is described in EP 0 480 618 A2 a method for manufacturing waveguides by using a polymeric multilayer laminate and a press-tool comprising a topographic pattern corresponding to a waveguide pattern. The multilayer laminate comprises a core with a relatively high refractive index and two surrounding layers around said core with a lower refractive index than the core. The multilayer laminate is placed on one side of a suitable support and then pressed onto the opposite side with the press-tool so that the topographic pattern stands out in relief in the multilayer laminate.

A disadvantage of the above invention is that the waveguide pattern after embossing must be aligned in a connector body in order to make contacting possible.

2. Disclosure of the Invention

In optical telecommunication one often meets a situation where an optical fiber needs to be divided up into a number of other fibers or where a number of fibers must be coupled together to a single fiber. Here we are talking about optical fiber connectors in the form of splitters or combiners. The problem with today's technology is that when a fiber connector is to be introduced into e.g. an optical net then this connector means that several interfaces are generated. This can mean that the optical wave can be thinned out at the interfaces. Several components can also be introduced into the system for which there is not always space.

The present invention tackles a problem of how a waveguide pattern, and especially optical splitters or combiners, can be arranged and aligned in a connector body in a simple, space-saving and cost-effective way.

The connector body, which can be U-shaped, can have an MT-interface in its connecting end. In the U-shaped recess of the connector body there is arranged a topographic pattern for forming the desired waveguide structure. The waveguide structure can, for example, be simple waveguides, splitters or more advanced optical structures.

Thus, in the connector body there is arranged a topographical pattern. The connector body with the associated topographical pattern is used as a press-tool for pressing forth waveguides in a multilayer laminate. The method for producing said waveguide structure arranged in the connector body can take place as follows: The connector body is placed over a suitable multilayer laminate of transparent polymeric material; the multilayer laminate in turn is placed onto a rigid foundation, whereafter a press device presses the connector body against the rigid foundation so that the topographical pattern in the connector body stands out in relief in the multilayer laminate in order to form a waveguide pattern. The multilayer laminate remains in the connector body after the pressing has been finished.

The purpose of the present invention is, in a simple and cheap way, to obtain a contact connector comprising a light-waveguide pattern.

An advantage of the present invention is that the contact connector with associated waveguide pattern can be manufactured on an assembly line.

Another advantage of the present invention is that it does not require any separate embossing tool.

Yet another advantage of the present invention is that the contact connector can be provided with an MT-interface.

A further advantage is that no subsequent adjustment of the waveguides in relation to the connector body needs to be done.

The invention will now be described more closely with the help of preferred embodiments and with reference to the appended drawings.

DESCRIPTION OF THE FIGURES

FIG. 4a shows a three-layer laminate of transparent polymeric material.

FIG. 4b shows the refractive index as a function of the thickness of the laminate shown in FIG. 4a.

FIG. 5a shows a five-layer laminate of transparent polymeric material.

FIG. 5b shows the refractive index as a function of the thickness of the laminate shown in FIG. 5a.

FIG. 6a shows a laminate with a refractive index gradient.

FIG. 6b shows the refractive index as a function of the thickness of the laminate shown in FIG. 6a.

PREFERRED EMBODIMENTS

Figure 1A:
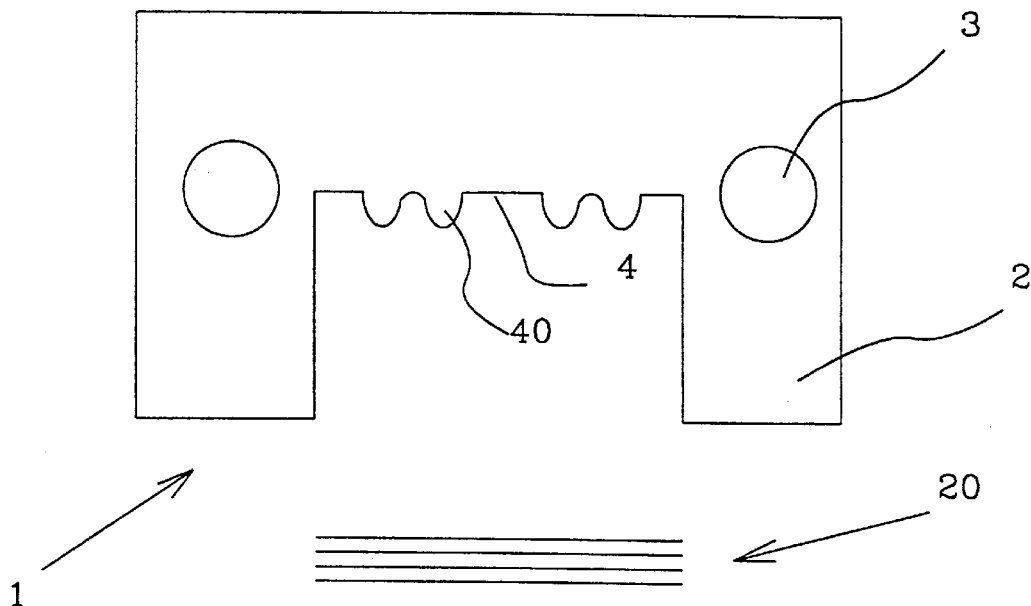
FIG. 1a shows from the contact side an example of an embodiment of a connector body comprising a topographic embossing pattern placed above a multilayer laminate.
Figure 1B:
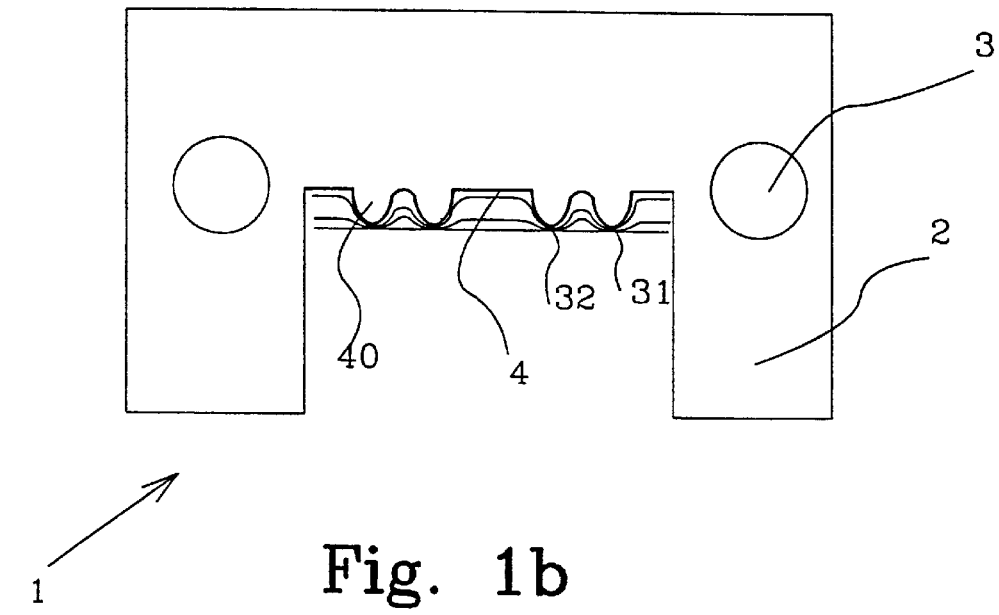
FIG. 1b shows from the contact side the same example of an embodiment of the connector body as in FIG. 1a, which here has been pressed together with the multilayer laminate.

FIG. 1a shows an example of an embodiment of a connector body 1 comprising a topographic pattern 40. Said topographic pattern 40 is arranged on the plane surface 4 between the legs 2 of the connector body 1. The topographic pattern 40 with a structure for forming an optical pattern, is intended through a press or pressure step to stand out in relief on e.g. a laminate structure 20 made of e.g. thermoplastic workable, plastic workable or viscous workable material. The materials with the higher refractive index are in the middle of the laminate structure 20. The laminate structure can consist of more than three layers or only one layer with a refractive index gradient, however, still such that materials with higher refractive indices ("core") are surrounded by materials with lower indices ("cladding"). FIG. 1b shows the connector body with a pressed optical waveguide pattern.

Figure 2A:
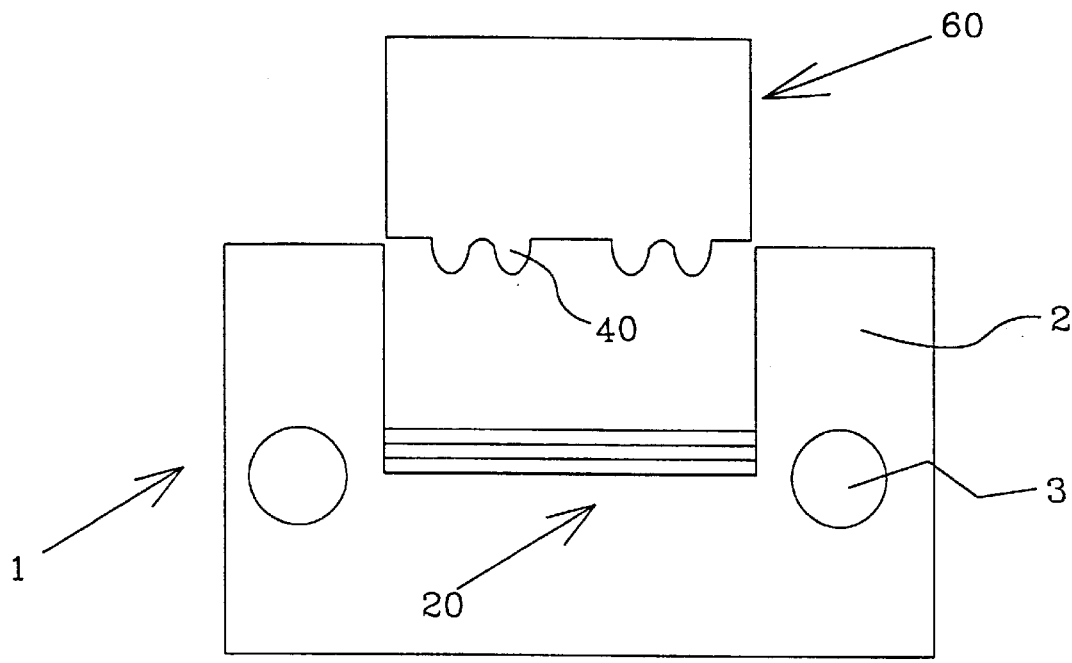
FIG. 2a shows from the side a connector body comprising a multilayer laminate and a press tool for embossing said multilayer laminate in the connector body.

FIG. 2a shows a connector body 1 with a transparent polymeric multilayer laminate arranged between the legs 2. The laminate comprises, exactly like described above, at least one middle layer of material with a higher refractive index and at least two outer layers of materials with lower refractive indices. The multilayer laminate 20 is embossed directly in the connector body 1 by a press tool 60. The press-tool 60 comprises a topographic pattern 40 corresponding with the desired waveguide structure. The press-tool 60 presses together the multilayer laminate 20 in the connector body so that the topographic pattern 40 stands out in relief in the multilayer laminate 20 in order to form the waveguide pattern.

Figure 3A:
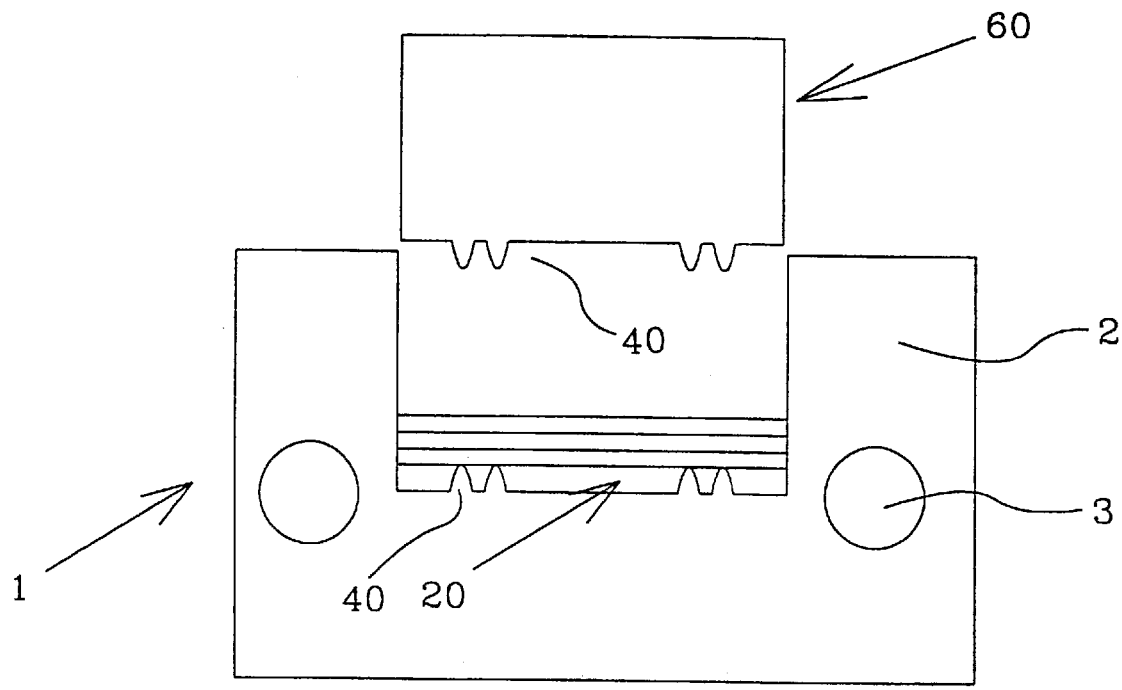
FIG. 3a shows from the side a connector body comprising a topographical pattern and a press-tool with a topographical pattern for embossing a multilayer laminate arranged between the connector body and the press-tool.

FIG. 3a shows a connector body 1 comprising a topographic pattern 40 and a press-tool 60 comprising a topographic pattern 40. Between the press-tool 60 and the connector body 1 a multilayer laminate 20 is arranged. The connector body 1 and the press-tool 60 are pressed together and the topographic pattern 40 stands out in relief in the multilayer laminate 20 in order to form the waveguide pattern.

Alternative starting laminates are illustrated in FIGS. 4–6. FIG. 4a shows a multilayer laminate 20 comprising three layers 21, 25, 29. The middle layer 25 has a higher refractive index than the surrounding layers 21 and 29. FIG. 4b shows the refractive index as a function of the thickness of the multilayer laminate in FIG. 4a.

FIG. 5a shows a multilayer laminate comprising five layers 21, 22, 25, 28, 29. The middle layer 25 has a higher refractive index than the surrounding layers 21, 22, 28, 29. FIG. 5b shows the refractive index as a function of the thickness of the multilayer laminate of FIG. 5a.

Figures 6A, 6B:
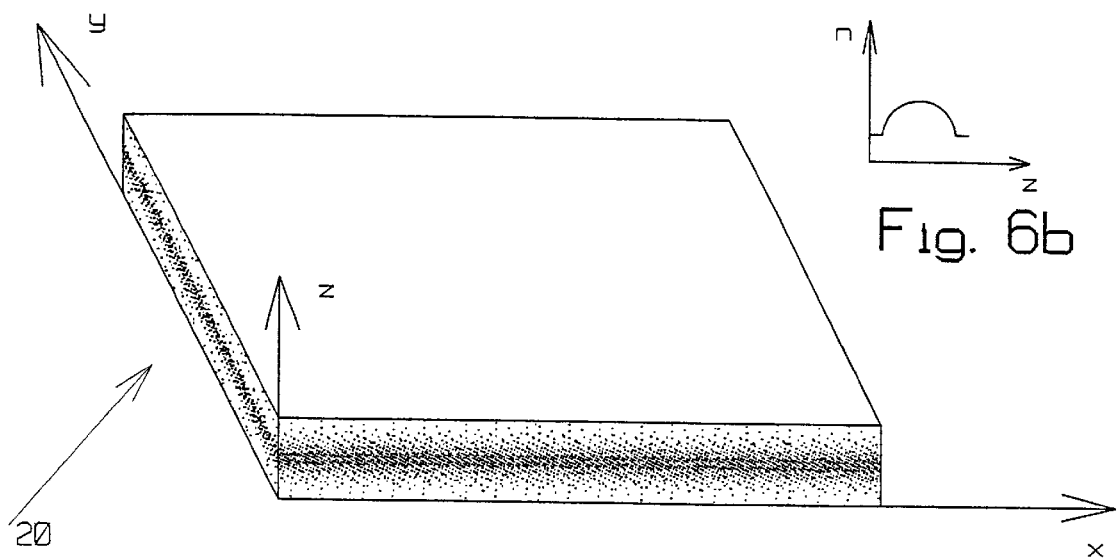

FIG. 6a shows a layer with a refractive index gradient. Even here the middle portion of the layer has a higher refractive index compared to the surrounding portions. FIG. 6b shows the refractive index as a function of the thickness of the layer.

In order that the multilayer laminate 20 shall remain in the connector body after the pressing, either one side of the multilayer laminate 20 or the intended place for the multilayer laminate 20 in the connector body 1 can be completely or partially covered with a fastening material. The fastening material can, for example, be glue. When, for example, a three-layer laminate is to be arranged in a connector body 1, one side of the laminate can be a combined glue and cladding material. The glue has therefore a lower refractive index than the core material.

Figure 2B:
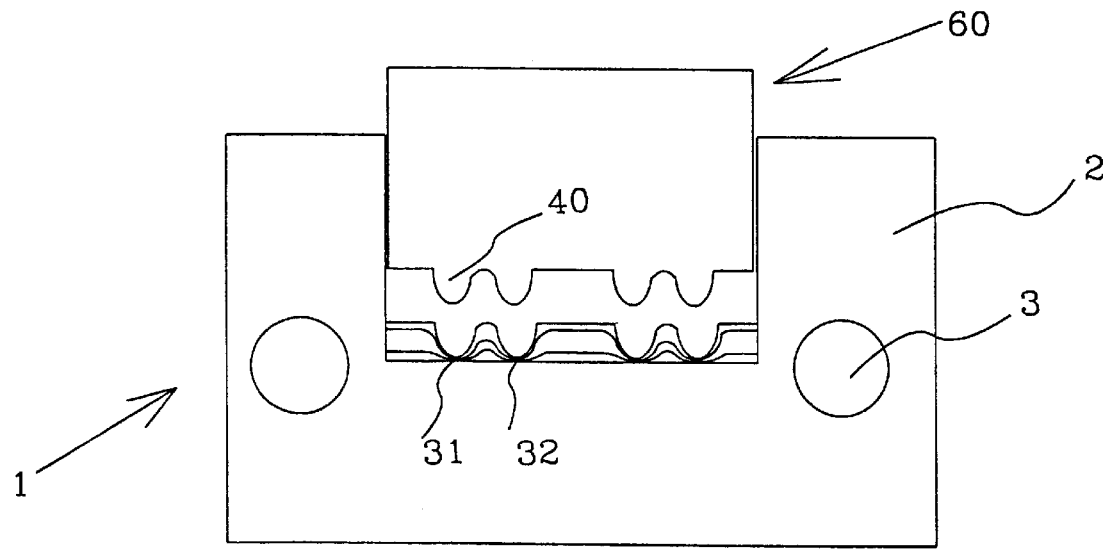
FIG. 2b shows from the side the connector body with associated multilayer laminate embossed by the press tool shown above.
Figure 3B:
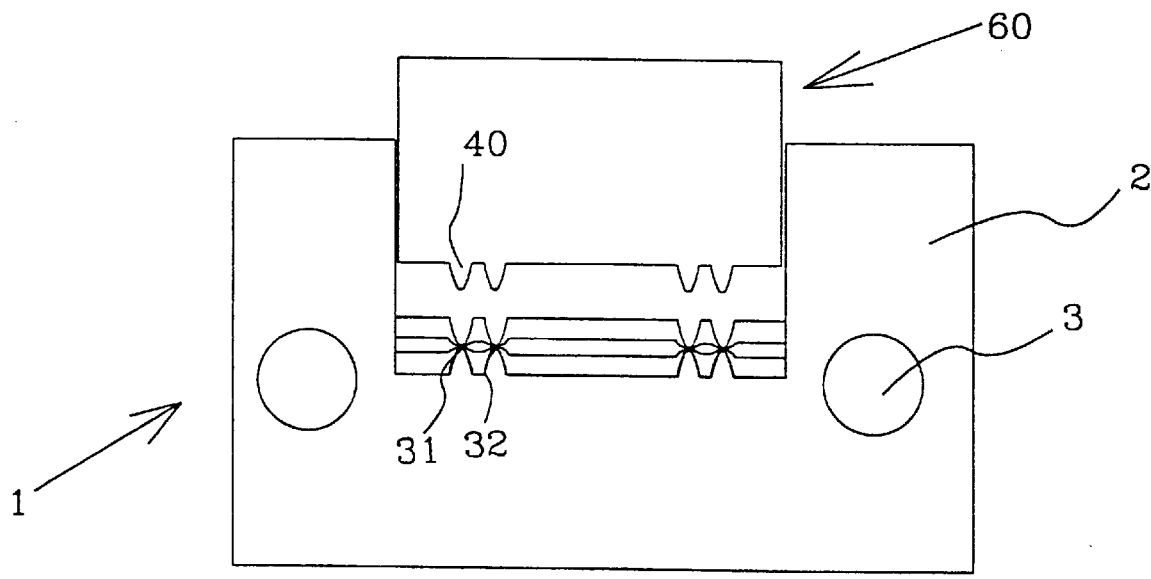
FIG. 3b shows the connector body comprising an embossed multilayer laminate.

When a separate press-tool is used for pressing a waveguide structure directly into a connector body, see FIGS. 2 and 3, it is conceivable that the layer adjacent to the connector body is arranged first and is a combined glue and cladding material. Then a two-layer laminate is arranged onto said combined glue and cladding material so that the layer with the higher refractive index is laid upon the combined glue and cladding material. The other layer in the two-layer laminate has preferably similar flow characteristics and a similar refractive index as the combined glue and cladding material.

With only one process step (press-, pressure- or embossing step) the laminate is transformed by the waveguide connector with the associated topographic pattern so that the laminate structure 20 which originally could lead (retain) light in the middle layer (so-called buried slab waveguide) now has a waveguide pattern in the x-y-plane, where said x-y-plane coincides with the surface 4 on the waveguide connector 1. The z-direction is defined as the height and thickness direction of the laminate 20. The transforming of the laminate 20 needs to be so extensive that the material in the core with the higher refractive index is pressed together so much that the dimension makes optical waveguiding impossible, i.e. the cross section of a sufficiently embossed waveguide foil forms a pair of thin "tails" 31, 32 of core material 25 which cannot leak out light.

It is assumed to be implicit that the various layers which are embossed have the same flow characteristics during embossing. If, moreover, the flow characteristics (the viscoelasticity, the viscosity and the plasticity) are adapted between the layers, a more optimal distribution of the material can take place. For example, the part of the core material which ends up in the tail 31 or 32 is reduced considerably if the core material is more easily flowing in the embossing process, i.e. that the core material is transported more easily in the x-y-plane than the surrounding so-called cladding material.

The material which can be embossed can be e.g. thermoplastics, curing plastics, UV- or light-curing plastics or a combination of these. However, during the embossing process the materials need to be sufficiently workable. After embossing the shape is fixed, which according to the invention is the same thing as the waveguide connector 1, through cooling (thermoplastics), through heat treatment (curing plastics) or through UV- or light radiation (UV- or light-curing materials) or a combination of these. Also wave lengths other than UV and visible light, from microwave to ionized X-ray radiation, can in principle be used to contribute to the reactions which make the material hard (non-flowing). In certain situations the core could be allowed to be viscous.

The precision-embossed pattern of the press-tool (connector body) can be made by producing a so-called Ni-master from e.g. a surface with a suitable relief pattern by photo-lithographic technics (e.g. UV-patterning of photo-resist with development in order to obtain the intended topography). V-groove etching and other etching of silicon can also be used. Deeper embossing patterns can be obtained by so-called spark machining.

The connector body can comprise two guide holes 3 associated with an MT-interface.

Figure 7:
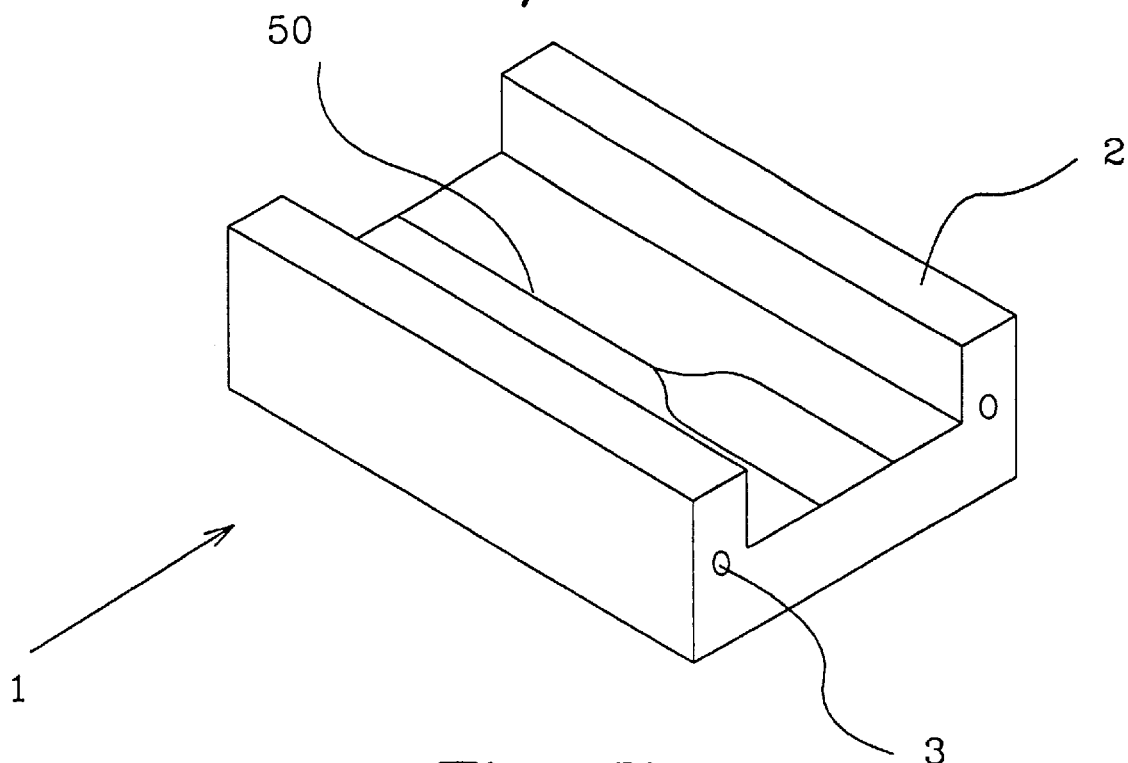
FIG. 7 shows a perspective view of a connector body comprising an optical pattern.

FIG. 7 shows a connector body comprising an optical waveguide pattern 50 in the form of an optical splitter.

The invention is naturally not limited to the embodiments described above and shown on the drawings, but can be modified within the scope of the accompanying claims.

I claim:

1. A device comprising:
    a waveguide pattern arranged in a connector body through embossing of a transparent polymeric multilayer laminate by pressing the connector body against the multilayer laminate, at least one layer of the multilayer laminate being formed of a core and at least two other layers of the multilayer laminate being formed of a cladding material, said cladding material surrounding said core on each side of said core layer, the cladding material having a lower refractive index than the core material, the connector body having a topographic pattern for said embossing of the transparent polymeric multilayer laminate, said multilayer laminate being fixed in the connector body after said pressing, the connector body having a contact interface for connecting the waveguide pattern to an optical path.

2. Device according to claim 1, wherein the connector body comprises an MT-interface.

3. Device according to claim 1, wherein the connector body comprises an MAC-interface.

4. Device according to claim 1, wherein the waveguide pattern comprises at least one optical splitter or combiner.

5. Device according to claim 1, wherein the connector body is completely or partially coated with fastening material on the topographic pattern.

6. Device according to claim 1, wherein at least one side of the cladding layer of the multilayer laminate is formed of a combined cladding layer and glue layer.

7. Device according to claim 1, wherein at least one side of the multilayer laminate is completely or partially coated with a fastening material.

8. A waveguide connector, comprising:
   a waveguide pattern formed from a laminate;
   a connector body having a contact interface for connecting said waveguide pattern to an optical path, said waveguide pattern being formed by pressing at least one of said laminate and said connector body against the other of said laminate and said connector body, said waveguide pattern being fixed to said connector body after said pressing.

9. The waveguide connector of claim 8, wherein said waveguide pattern includes an optical combiner.

10. The waveguide connector of claim 8, further comprising a fastening material that at least partially fastens said multilayer laminate to said connector body.

11. The waveguide connector of claim 8, wherein said laminate includes a layer having a refractive index gradient that varies through a thickness of said layer.

12. The waveguide connector of claim 8, further comprising a topographic pattern formed in a surface of said connector body, said topographic pattern for defining said waveguide pattern when at least one of said laminate and said connector body is pressed against the other of said laminate and said connector body.

13. The waveguide connector of claim 8, in combination with a press tool, said press tool having a topographic pattern formed in a surface of said press tool, said topographic pattern for defining said waveguide pattern when at least one of said laminate and said connector body is pressed against the other of said laminate and said connector body.

14. The waveguide connector of claim 8, in combination with a press tool, said press tool and said connector body each having a topographic pattern, said topographic patterns for defining said waveguide pattern when at least one of said laminate and said connector body is pressed against the other of said laminate and said connector body.

15. The waveguide connector of claim 8, wherein said laminate includes at least one core layer sandwiched between at least two other layers, said core layer having a higher refractive index than the refractive index of said two other layers.

16. The waveguide connector of claim 8, wherein said contact interface includes at least one guide hole.

17. The waveguide connector of claim 16, wherein said contact interface includes two guide holes.

18. The waveguide connector of claim 8, wherein said contact interface includes a MT-interface.

19. The waveguide connector of claim 8, wherein said contact interface includes a MAC-interface.

20. The waveguide connector of claim 8, wherein said waveguide pattern includes an optical splitter.

21. Method for arranging a waveguide pattern in a connector body, comprising:
   placing a topographic pattern of the connector body over a transparent polymeric multilayer laminate arranged on a rigid foundation, where at least one layer of the multilayer laminate is formed of a core and at least two other layers of the multilayer laminate are formed of a cladding material, said cladding material surrounding said core layer on each side of said core layer, and the cladding material having a lower refractive index than the core material; and
   pressing the connector body towards the polymeric multilayer laminate so that the topographic pattern in the connector body stands out in relief in the multilayer laminate and forms the waveguide pattern in the connector body, the multilayer laminate being fixed in the connector body after said pressing, the connector body having a contact interface for connecting the waveguide pattern to an optical path.

22. Method for arranging a waveguide pattern in a connector body, comprising:
   placing a topographic pattern of a press-tool over a transparent polymeric multilayer laminate arranged in a connector body, where at least one layer of the multilayer laminate is formed of a core and at least two other layers of the multilayer laminate are formed of a cladding material, said cladding material surrounding said core layer on each side of said core layer, and the cladding material having a lower refractive index than the core material; and
   pressing the press-tool towards the polymeric multilayer laminate so that the topographic pattern in the press-tool stands out in relief in the multilayer laminate and forms the waveguide pattern in the connector body, the multilayer laminate being fixed in the connector body after said pressing, the connector body having a contact interface for connecting the waveguide pattern to an optical path.

23. Method for arranging a waveguide pattern in a connector body, comprising:
   placing a topographic pattern of a press-tool over a transparent polymeric multilayer laminate arranged in a connector body, the connector body having a topographic pattern, where at least one layer of the multilayer laminate is formed of a core and at least two other layers of the multilayer laminate are formed of a cladding material, said cladding material surrounding said core layer on each side of said core layer, and the cladding material having a lower refractive index than the core material; and
   pressing the press-tool towards the polymeric multilayer laminate so that the topographic pattern in the press-tool and the connector body stands out in relief in the multilayer laminate and forms the waveguide pattern in the connector body, the multilayer laminate being fixed in the connector body after said pressing, the connector body having a contact interface for connecting the waveguide pattern to an optical path.

24. A method of forming a waveguide connector, comprising:
   pressing at least one of a laminate and a connector body against the other of the laminate and the connector body to define a waveguide pattern, the waveguide pattern being fixed to the connector body, the connector body having a contact interface for connecting the waveguide pattern to an optical path.

25. The method of claim 24, wherein a press tool presses at least one of the laminate and the connector body against the other of the laminate and the connector body.

26. The method of claim 25, wherein the press tool includes a topographic pattern that defines the waveguide pattern when at least one of the laminate and the connector body is pressed against the other of the laminate and the connector body.

27. The method of claim 26, wherein the connector body includes a topographic pattern that defines the waveguide pattern when at least one of the laminate and the connector body is pressed against the other of the laminate and the connector body.

28. The method of claim 24, wherein the connector body and the laminate are pressed against each other.

29. The method of claim 24, wherein the connector body includes a topographic pattern that defines the waveguide pattern when at least one of the laminate and the connector body is pressed against the other of the laminate and the connector body.

30. The method of claim 24, wherein said pressing of at least one of the laminate and the connector body against the other of the laminate and the connector body fixes the waveguide pattern to the connector body.

31. The method of claim 24, wherein the connector body is pressed against the laminate.

32. The method of claim 24, wherein the laminate is pressed against the connector body.

33. The method of claim 24, wherein the pressing of at least one of the laminate and the connector body against the other of the laminate and the connector body defines a waveguide pattern having an optical splitter.

34. The method of claim 24, wherein the pressing of at least one of the laminate and the connector body against the other of the laminate and the connector body defines a waveguide pattern having an optical combiner.

35. The method of claim 24, wherein the contact interface includes at least one guide hole.

36. The method of claim 24, wherein the contact interface includes an MT-interface.

37. The method of claim 24, wherein the contact interface includes a MAC-interface.

38. The method of claim 24, wherein the laminate includes a core layer sandwiched between two other layers, the core layer having a higher refractive index than the refractive index of the two other layers.

39. The method of claim 24, wherein the laminate includes plastic material, further comprising curing the plastic material of the laminate after said pressing of at least one of the laminate and the connector body against the other of the laminate and the connector body.

40. The method of claim 24, wherein the laminate includes a layer of glue, said pressing of at least one of the laminate and the connector body against the other of the laminate and the connector body causing the glue to fix said waveguide pattern to said connector body.

* * * * *